June 8, 1965   W. L. ACKERMAN   3,187,353
COMB HONEY FRAME
Filed Feb. 10, 1964
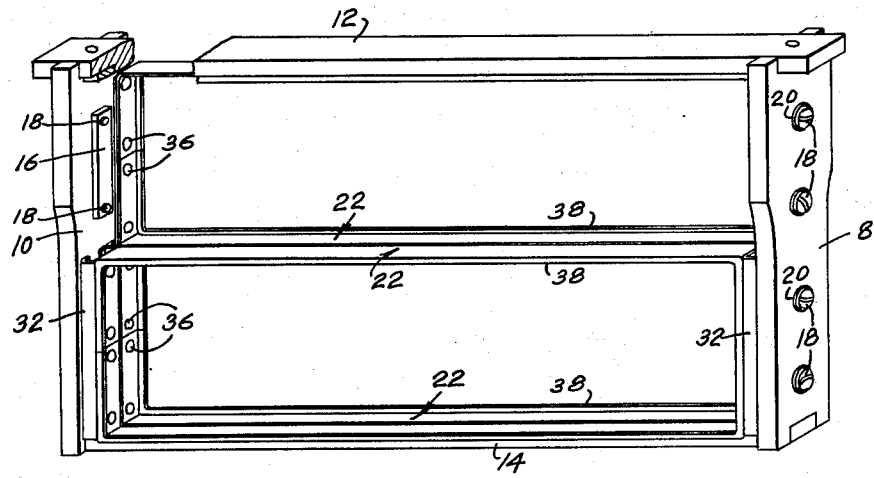
FIG. 1.
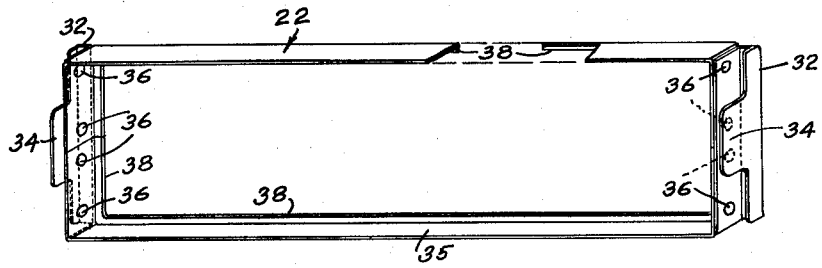
FIG. 2.
FIG. 4.
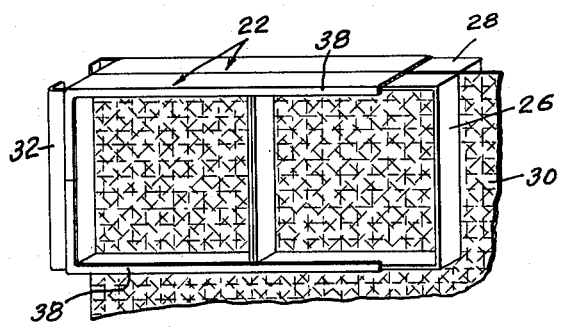
FIG. 3.
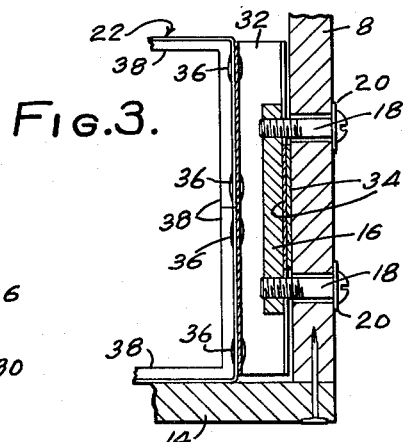
INVENTOR.
WILLIS L. ACKERMAN
BY Evert A. Autrey
HIS ATTORNEY

United States Patent Office 3,187,353
Patented June 8, 1965

3,187,353
COMB HONEY FRAME
Willis L. Ackerman, 4806 Carpinteria Ave.,
Carpinteria, Calif.
Filed Feb. 10, 1964, Ser. No. 343,522
1 Claim. (Cl. 6—10)

This invention relates generally to the production of honey and more particularly to the production of comb section honey.

It is possible for an average beekeeper using standard equipment to readily produce high quality extracted honey. However, the economical production of high quality section comb honey has heretofore been difficult. Conventional equipment requires that separators be placed between section boxes and these parts held with follower boards, wedges, and springs to form a unitary structure. It is impractical to disassemble the unit for inspection purposes while honey is being deposited. The separators together with wooden section boxes seriously hamper ventilation and restrict normal clustering of bees while drawing comb and filling cells. To obtain full sections with conventional equipment it is necessary to force the bees. This forcing involves reducing the physical space available to the colony; by retaining all the bees in only half the space the bees are forced to use the wood section box super which they are highly reluctant to do. In this crowded condition and with little space for brood and storage, well filled combs can be obtained but the practice reduces the total amount of honey collected.

In the instant invention a simple open wooden frame, which may conveniently be a Hoffman style frame, fitted with foundation wax, half boxes, clamps, and locking bars forms a unit which functions in an efficient and economical manner for the production of section comb honey. Each unit replaces a conventional Hoffman frame usually used in the supers to produce extracted honey.

An object of the invention is to provide a comb honey frame which may be inspected, removed, changed, or installed quickly and easily at any time during the honey flow.

Another object is to provide means for producing section comb honey in paired half boxes joined by honeycomb only.

An additional object is to provide apparatus to eliminate the need for unitizing supers, to eliminate the need for separators and to allow normal hive ventilation, to reduce propolis deposits, and to reduce time consumed in all phases of production.

A further object is to provide means for producing section comb and honey for extraction purposes in the same super at the same time if desired.

An additional object is to provide a comb honey frame which, although containing sections, will be filled completely and efficiently by bees without forcing.

Other objects and many of the attendant advantages of this invention will be readily appreciated as the same becomes better understood by reference to the following description.

FIG. 1 is a perspective view of parts of a comb honey frame embodying the invention;

FIG. 2 is a perspective view of a clamp of the comb honey frame shown in FIG. 1;

FIG. 3 is an enlarged sectional view of the locking device for securing the holding clamps to the frame; and FIG. 4 is a view of honey comb half boxes with foundation wax.

The structure shown in FIG. 1 includes an open frame, commonly known as a Hoffman style frame, comprising end pieces 8 and 10, top member 12, and bottom member 14. The frame is in common use for the production of brood combs and extracted honey and is generally made of soft wood. To this frame is added locking bars 16, of which one is shown, actuated by machine screws 18 inserted through the wiring holes in each end bar of the open frame. Flat washers 20 are provided under the heads of screws 18. Clamps 22 serve to hold half boxes on opposing sides of the foundation wax 30 as shown in FIG. 4.

The structure of clamp 22 and its relation to locking bar 16 is shown in FIGS. 2 and 3. A three sided box 32 provided with tongue 34 is secured to the main body 35 of the clamp by means of rivets 36. The main body 35 of the clamp consists of four generally flat sides with a raised lip 38 along one edge. The clamp is rigidly secured in fixed relation to the Hoffman style frame by the action of locking bar 16 on tongue 34. The holes in locking bar 16 are tapped to engage the threads of screw 18 so that bar 16 is pulled toward end member 8 as the screws are tightened.

In FIG. 4 the positioning of half boxes 26 and 28 relative to foundation wax 30 and clamps 22 is shown. Clamps 22 as well as locking bars 16 are conveniently made of aluminum. The half boxes must be made special for this purpose each having four sides with the top and bottom open and are preferably moulded of a plastic such as, by way of example, cellulose acetate. The half boxes are made to precise dimensions so that the edges of two half boxes on opposite sides of the foundation wax exactly coincide. The half boxes are joined in the final comb honey section solely by the wax comb. Plastic half boxes have the advantage over wooden sections that they may be smaller in total area than wooden sections but contain more honey and less wax as honey cells are built and fastened directly to the plastic boxes. Bees build a brace comb consisting of tough thick cells containing no honey to support the main comb when anchoring to wood. Also, salvaged plastic sections may be cleaned with hot water and reused whereas it is not practical to clean wax and honey from wooden comb boxes.

To prepare the assembly for placing in the hive super, an open frame is laid on its side and the tongues 34 of two clamps are inserted under locking bars 16. The frame is then turned over and half boxes 28 to fill the space available in the clamps are then inserted. A sheet of comb honey foundation wax 30 is placed over the half boxes, and the remaining half boxes are then positioned to fit directly over the half boxes on the underside of the foundation wax. Two additional clamps are then applied over the upper array of half boxes with the clamp tongues inserted under locking bars 16. Screws 18 are then tightened thus locking the assembly and forming an integral unit.

The assembly is placed in the super of the hive in the same manner as are Hoffman style frames for extracted honey production. No separators are required. The status of the comb honey may be determined at any time by removing the top of the hive and simply lifting up the frame assembly. To remove the filled comb honey sections, screws 18 are loosened and all clamps are removed. A thin knife is then inserted between the half boxes to cut the foundation wax. Alternatively, the comb sections may be separated by exerting sideways pressure and snapping off the individual sections.

Obviously, many modifications and variations of the present invention are possible in the light of the above teachings. It is therefore to be understood that within the scope of the appended claim the invention may be practiced otherwise than as specifically described.

What is claimed is:

A comb honey frame comprising:
(a) an open frame;

(b) at least one pair of clamps defining a generally rectangular parallelepiped having two opposing open sides;
(c) means for securing said clamps to said frame;
(d) at least one pair of half boxes disposed in the parallelepiped formed by said clamps;
(e) a raised lip secured to said clamps along the edges defining said open sides and adapted to hold said half boxes in a fixed and aligned position relative to each other and said clamps; and
(f) foundation wax disposed between said half boxes.

References Cited by the Examiner
UNITED STATES PATENTS

| | | | |
|---|---|---|---|
| 994,559 | 6/11 | Aspinwall | 6—11 |
| 1,116,920 | 11/14 | Rahn | 6—2 |
| 1,722,169 | 7/29 | Yater | 6—10 |
| 2,591,328 | 4/52 | Yanik | 6—10 |

SAMUEL KOREN, *Primary Examiner.*
LUCIE H. LAUDENSLAGER, *Examiner.*